United States Patent
Ogawa et al.

(10) Patent No.: US 10,696,799 B2
(45) Date of Patent: Jun. 30, 2020

(54) ORGANISM ADHESION REDUCTION PAINT, METHOD FOR MANUFACTURING THE SAME, AND ORGANISM ADHESION REDUCTION COATING

(71) Applicants: FUJI SILYSIA CHEMICAL LTD., Aichi (JP); DAISYO GREEN INDUSTRY CO., LTD., Okayama (JP); KURARAY CO., LTD., Okayama (JP)

(72) Inventors: Mitsuteru Ogawa, Aichi (JP); Shinji Yamamoto, Aichi (JP); Kiyoshi Kuroda, Aichi (JP); Mutsuhiro Ito, Aichi (JP); Yoshio Nakano, Aichi (JP); Akio Kameyama, Okayama (JP); Tadahito Fukuhara, Okayama (JP); Keisuke Morikawa, Okayama (JP)

(73) Assignees: FUJI SILYSIA CHEMICAL LTD., Aichi (JP); DAISYO GREEN INDUSTRY CO., LTD., Okayama (JP); KURARAY CO., LTD., Okayama (JP)

( * ) Notice: Subject to any disclaimer, the term of this patent is extended or adjusted under 35 U.S.C. 154(b) by 91 days.

(21) Appl. No.: 15/745,011

(22) PCT Filed: Jul. 11, 2016

(86) PCT No.: PCT/JP2016/070448
§ 371 (c)(1),
(2) Date: Jan. 15, 2018

(87) PCT Pub. No.: WO2017/010459
PCT Pub. Date: Jan. 19, 2017

(65) Prior Publication Data
US 2018/0223051 A1    Aug. 9, 2018

(30) Foreign Application Priority Data
Jul. 13, 2015   (JP) ................... 2015-139876

(51) Int. Cl.
| | | |
|---|---|---|
| *C08J 3/02* | (2006.01) | |
| *C08L 101/06* | (2006.01) | |
| *C09D 201/00* | (2006.01) | |
| *C09D 5/16* | (2006.01) | |
| *C08J 3/12* | (2006.01) | |
| *C09D 129/04* | (2006.01) | |
| *C09D 171/08* | (2006.01) | |
| *C08K 3/22* | (2006.01) | |
| *C08K 3/36* | (2006.01) | |

(52) U.S. Cl.
CPC . *C08J 3/02* (2013.01); *C08J 3/12* (2013.01); *C08L 101/06* (2013.01); *C09D 5/1618* (2013.01); *C09D 5/1637* (2013.01); *C09D 129/04* (2013.01); *C09D 171/08* (2013.01); *C09D 201/00* (2013.01); *C08J 2329/04* (2013.01); *C08J 2371/08* (2013.01); *C08K 3/22* (2013.01); *C08K 3/36* (2013.01); *C08K 2003/222* (2013.01); *C08K 2003/2227* (2013.01); *C08K 2003/2268* (2013.01)

(58) Field of Classification Search
CPC ... C08J 3/02; C08J 3/12; C08J 2329/04; C08J 2371/08; C09D 201/00; C09D 129/04; C09D 171/08; C09D 5/1618; C09D 5/1637; C08L 101/06; C08K 3/22; C08K 3/36; C08K 2003/222; C08K 2003/2227; C08K 2003/2268
USPC ........................................................ 524/557
See application file for complete search history.

(56) References Cited

U.S. PATENT DOCUMENTS

| | | | | |
|---|---|---|---|---|
| 2010/0269731 A1* | 10/2010 | Tofte Jespersen | ....... | A61K 9/48 106/18.32 |
| 2012/0045743 A1* | 2/2012 | Okano | ................... | G09B 23/30 434/272 |
| 2015/0132550 A1 | 5/2015 | Kohno et al. | | |

FOREIGN PATENT DOCUMENTS

| | | | |
|---|---|---|---|
| CN | 104031275 A | | 9/2014 |
| JP | 2000143672 A | | 5/2000 |
| JP | 2003170184 A | * | 6/2003 |
| JP | 2003170184 A | | 6/2003 |
| JP | 2007050351 A | * | 3/2007 |
| JP | 2007050351 A | | 3/2007 |
| JP | 2008086967 A | | 4/2008 |
| JP | 2011503302 A | | 1/2011 |
| JP | 2011076035 A | | 4/2011 |

(Continued)

OTHER PUBLICATIONS

Extended European Search Report dated Jan. 7, 2019 for corresponding European Application No. 16824439.0.

(Continued)

*Primary Examiner* — Michael Bernshteyn
(74) *Attorney, Agent, or Firm* — David D. Brush; Westman, Champlin & Koehler, P.A.

(57) ABSTRACT

A method for manufacturing an organism adhesion reduction paint includes a first process of gelling a raw material composition that includes polyvinyl alcohol and at least one of a hydroxyl group-containing inorganic compound or an inorganic oxide; a second process of drying and subsequently pulverizing a resulting product in the first process to thereby obtain a composite gel fine powder; and a third process of adding the composite gel fine powder to a main component of a two-component urethane paint and stirring, to thereby prepare a main component of the organism adhesion reduction paint, and also adding a curing agent immediately before use.

8 Claims, No Drawings

(56) References Cited

FOREIGN PATENT DOCUMENTS

JP    2012170859 A    9/2012
WO    2013189699 A1    12/2013

OTHER PUBLICATIONS

International Search Report dated Jul. 22, 2016 for International Application No. PCT/JP2016/070448, filed Jul. 11, 2016.
Written Opinion of the International Searching Authority dated Jul. 22, 2016 for International Application No. PCT/JP2016/070448, filed Jul. 11, 2016.
Notice of Reasons for Rejection dated Jan. 24, 2017 for corresponding Japanese Patent Application No. 2016560939, with English Translation.
Notice of Reasons for Rejection dated Apr. 25, 2017 for corresponding Japanese Patent Application No. 2016560939, with English Translation.
Decision of Rejection dated Aug. 8, 2017 for corresponding Japanese Patent Application No. 2016560939, with English Translation.
Decision of Dissmal of Amendment dated Aug. 8, 2017 for corresponding Japanese Patent Application No. 2016560939, with English Translation.
International Preliminary Report on Patentability dated Jan. 25, 2018 for International Application No. PCT/JP2016/070448.
English machine translation of the Office Action dated Sep. 3, 2019 for corresponding Chinese Patent Applicalion No. 201680041334.0.
R.. Murakami et al., "Properties of poly (vinyl alcohol)/silica hybrid gel particles", "Journal of Materials Science Letters", vol. 14, No. 13, pp. 937-938, Dec. 31, 1995.

* cited by examiner

ORGANISM ADHESION REDUCTION PAINT, METHOD FOR MANUFACTURING THE SAME, AND ORGANISM ADHESION REDUCTION COATING

CROSS-REFERENCE TO RELATED APPLICATION

This Application is a Section 371 National Stage Application of International Application No. PCT/JP2016/070448, filed Jul. 11, 2016, which is published as WO 2017/010459 A1, on Jan. 19, 2017, not in English, and claims the benefit of Japanese Patent Application No. 2015-139876 filed on Jul. 13, 2015 with the Japan Patent Office, and the entire contents of which are hereby incorporated by reference in their entireties.

TECHNICAL FIELD

The present disclosure relates to a composite gel, a paint, a coating, and a method for manufacturing a composite gel.

BACKGROUND ART

Organisms living in water include organisms that adhere to underwater structures and cause various damages. For example, barnacles, mussels, and hydrozoans sometimes grow adhering to ships. In such cases, damages such as ship speed reduction and fuel consumption increase may be caused. As countermeasures against these problems, paints capable of reducing adhesion of the above-described organisms are applied to ship hulls. There are known active components of the paints, such as cuprous oxide and copper rhodanide.

PRIOR ART DOCUMENTS

Patent Documents

Patent Document 1: Japanese Unexamined Patent Application Publication No. 2000-143672

SUMMARY OF THE INVENTION

Problems to be Solved by the Invention

In the case of the above-described paints, however, cuprous oxide and copper rhodanide dissolve from coatings and disperse into water. Thus, there is a problem that copper compounds pollute the environment. Also, it is difficult to collect copper resources that have dispersed into water. Thus, there also is a problem that valuable copper resources are wasted.

In one aspect of the present disclosure, it is preferable to provide a composite gel, a paint, and a coating that are capable of avoiding environmental pollution, and a method for manufacturing the composite gel by using, as a novel active component to reduce adhesion of organisms, a raw material having high biodegradability instead of copper resources.

Means for Solving the Problems

A composite gel in one aspect of the present disclosure comprises a substance prepared by gelling a raw material composition that comprises, as main components, a hydroxyl group-containing organic polymer compound and at least one of a hydroxyl group-containing inorganic compound or an inorganic oxide.

In the composite gel, the hydroxyl group-containing organic polymer compound may be one or two selected from polyvinyl alcohol and polyethylene glycol. Also, in the composite gel, the polyvinyl alcohol may have a viscosity-average polymerization degree of 350 to 3500 and a saponification degree of 50 to 100 mol %. Further, in the composite gel, the polyethylene glycol may have a number-average molecular weight of 1000 to 25000.

In the composite gel, the hydroxyl group-containing inorganic compound may be one, or two or more selected from a hydroxyl group-containing silicon compound, aluminum hydroxide, magnesium hydroxide, and iron hydroxide. Also, in the composite gel, the hydroxyl group-containing silicon compound may be silica.

In the composite gel, the inorganic oxide may be one, or two or more selected from aluminum oxide, magnesium oxide, and iron oxide.

Also, a paint in one aspect of the present disclosure is a paint that comprises the above-described composite gel.

A coating in one aspect of the present disclosure is a coating obtained by applying the above-described composite gel or a paint that comprises the above-described composite gel.

Further, a method for manufacturing a composite gel in one aspect of the present disclosure comprises a first process of gelling a raw material composition that comprises, as main components, a hydroxyl group-containing organic polymer compound and at least one of a hydroxyl group-containing inorganic compound or an inorganic oxide; and a second process of drying and subsequently pulverizing a resulting product in the first process to thereby obtain a composite gel fine powder.

MODE FOR CARRYING OUT THE INVENTION

Hereinafter, some example embodiments of the present disclosure will be described.

In the embodiments described below, materials mentioned below are used unless otherwise specified. As a polyvinyl alcohol (hereinafter abbreviated as "PVA"), PVA-217 produced by KURARAY CO., LTD. is used. Other PVAs may be used, and, for example, PVA-105, PVA-117, PVA-205, PVA-417, PVA-420H and PVA-424H produced by KURARAY CO., LTD. are preferable. As a polyethylene glycol (hereinafter abbreviated as "PEG"), polyethylene glycol 6000 is used. As a hydroxyl group-containing silicon compound, a silica gel is used. As the silica gel, SYLYSIA (Registered Trademark) (Grade: 350) (produced by FUJI SILYSIA CHEMICAL LTD.) is used. Other silica gels may be used, and, for example, SYLYSIA (Registered Trademark) (Grade: 430) is preferable.

The polyvinyl alcohol may be an unmodified polyvinyl alcohol, or may be a modified polyvinyl alcohol that is synthesized, for example, by copolymerization with a vinylester monomer within a scope not impairing the spirit of the present disclosure.

The vinylester monomer included in the modified polyvinyl alcohol may be, for example, α-olefin, such as ethylene, propylene, n-butene, and isobutylene; acrylic acid and salts thereof; acrylamide; acrylamide derivatives, such as N-methyl acrylamide, N-ethyl acrylamide, N,N-dimethyl acrylamide, diacetone acrylamide, acrylamide propane sulfonic acid and salts thereof, acrylamide propyl dimethyl amine and salts thereof or quaternary salts thereof, N-methylol acrylamide and derivatives thereof; methacrylamide; methacrylamide derivatives, such as N-methyl methacrylamide, N-ethyl methacrylamide, methacrylamide propane sulfonic acid and salts thereof, methacrylamide propyl dimethylamine and salts thereof or quaternary salts thereof, N-methylol methacrylamide and derivatives thereof; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; nitriles, such as acrylonitrile and methacrylonitrile; vinyl halides, such as vinyl chloride and vinyl fluoride; halogenated vinylidenes, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, fumaric acid and salts thereof or esters thereof; vinylsilyl compounds, such as vinyltrimethoxysilane; and isopropenyl acetate.

The content of a modified group derived from these vinylester monomers is preferably 0.1 to 10 mol % or less, more preferably 0.1 to 8.0 mol % or less, and further preferably 0.1 to 5.0 mol % or less. Only one type of polyvinyl alcohol may be used, or two or more types of polyvinyl alcohols may be used at the same time.

(1) First Embodiment 1-1. Compounding of PVA and Hydroxyl Group-Containing Inorganic Substance Compounding of PVA and hydroxyl group-containing inorganic substance was performed as described below.

First, a 5 mass % PVA solution was prepared. 5 g of silica gel was added to 20 g of the solution to obtain a paste. The paste was dried with a 110° C. dryer to obtain a silica/PVA composite gel. Also, by using aluminum hydroxide, magnesium hydroxide, and iron hydroxide in place of silica gel, an aluminum hydroxide/PVA composite gel, a magnesium hydroxide/PVA composite gel, and an iron hydroxide/PVA composite gel were obtained through similar procedures.

1-2. Composite Gel Solubility Test

In order to confirm the stability of the previously prepared composite gels, a solubility test was conducted as described below. 5 g of each of PVA, the silica/PVA composite gel, the magnesium hydroxide/PVA composite gel, and the iron hydroxide/PVA composite gel was measured into a 150 mesh stainless steel container (100 μm mesh opening) and was immersed in 100 mL of ion exchange water. The ion exchange water was stirred with a magnetic stirrer, and then a part of a supernatant solution was collected after a specified time has elapsed. The collected supernatant solution was placed in the 110° C. dryer, and an amount of the PVA eluted from the composite gel (or a total amount of the PVA and hydroxide) was evaluated from a remaining amount of solid content. Table 1 shows results of the solubility test of the composite gels.

TABLE 1

| | Elution Rate (%) | | | |
|---|---|---|---|---|
| Day | PVA | $SiO_2$/PVA | $Mg(OH)_2$/PVA | $Fe(OH)_3$/PVA |
| 0 | 0 | 0 | 0 | 0 |
| 1 | 83.9 | 1.5 | 12.6 | 11.9 |
| 2 | 93.4 | 2.1 | 13.4 | 12.7 |

As is clear from Table 1, the simple PVA showed an elution rate that reached 80 mass % after one day, whereas each of the silica/PVA composite gel, the magnesium hydroxide/PVA composite gel, and the iron hydroxide/PVA composite gel, showed a low elution rate. In particular, the silica/PVA composite gel showed an elution rate of not more than 2 mass %, which was a significantly low value. Also, after two days, the elution rate of each of the composite gels was a lower value than that of the simple PVA. This indicates that compounding of PVA with hydroxyl group-containing inorganic substance or compounding of PVA with inorganic oxide may lead to delay in dissolution of PVA. Accordingly, it is considered to be possible to retain in water a surface having similar natures to those of PVA for a longer time period than the simple PVA.

(2) Second Embodiment 2-1. Method for Manufacturing Composite Gel 5 g of PVA was dissolved into 95 g of water, and 10 g of silica gel was added to the PVA solution. By stirring at 4000 rpm for 10 minutes with a disperser, a slurry was prepared. The slurry was placed in a freezer to be frozen and was taken out of the freezer to melt naturally, and then was placed in the freezer to be frozen again. After repeating such process a plurality of times (for example, two or more times), a gelled state was maintained even at a room temperature, and a silica/PVA composite gel was prepared.

2-2. Organism Adhesion Prevention Test

The aforementioned silica/PVA composite gel was immersed in seawater for one month off Hyuga in Miyazaki Prefecture and for three months in Tamano Port in Okayama Prefecture, and an adhesion state of organisms living in the ocean was observed. Since adhesion of ocean organisms to the silica/PVA composite gel was not observed, an ability to avoid adhesion of organisms was confirmed.

(3) Third Embodiment 3-1. Method for Manufacturing Paint 5 g of PVA was dissolved into 95 g of water, and 10 g of silica gel was added to the PVA solution. By stirring at 4000 rpm for 10 minutes with a disperser, a slurry was prepared. The slurry was dried with a 110° C. dryer for 12 hours or longer. By pulverizing the dried substance, a silica/PVA composite gel fine powder having an average particle diameter of 3.4 μm was prepared.

The silica/PVA composite gel fine powder was added to a urethane solvent (trade name: Ureoru, produced by KAWAKAMI PAINT MFG. CO., LTD) to prepare a ship bottom paint. The mixing ratio of the urethane solvent and the fine powder was adjusted such that a mass ratio of urethane solvent with respect to fine powder was 100:5 to 20. Such mixing ratio enables obtainment of a paint with an antifouling property for practical use without excessive increase in viscosity of the paint. When an addition amount of the silica/PVA composite gel fine powder is larger than the above-described mixing ratio, the viscosity of the paint tends to increase. Thus, it will be difficult to apply the paint. Also, when the addition amount of the silica/PVA composite gel fine powder is smaller than the above-described mixing ratio, it tends to be difficult to obtain the antifouling property for practical use.

3-2. Organism Adhesion Prevention Test

A paint to which the silica/PVA composite gel fine powder was added and a paint to which the silica/PVA composite gel fine powder was not added were each applied to a plate of reinforced plastic (FRP). The FRP plates were immersed in the seawater for fourteen months in Tamano Port in Okayama Prefecture, and an adhesion state of organisms living in the ocean was observed.

In the case of the FRP plate to which the paint with the added silica/PVA composite gel fine powder had been applied, adhesion of organisms living in the ocean was hardly observed. In contrast, in the case of the FRP plate to which the paint without the silica/PVA composite gel fine powder had been applied, it was observed that barnacles, bivalves, and the like adhered to and lived on the FRP plate to cover the entire surface of the FRP base in a short time period after immersion in the seawater.

(4) Fourth Embodiment

4-1. Method for Manufacturing Paint 5 g of silica gel was added to 100 g of 5 mass % PVA solution. By stirring at 4000 rpm for 10 minutes with a disperser, a slurry was prepared, and a silica/PVA composite gel was prepared.

The silica/PVA composite gel was dried with a 110° C. dryer for 12 hours or longer. By pulverizing the dried substance, a silica/PVA composite gel fine powder having an average particle diameter of 3.4 μm was prepared.

10 pts. wt. of the fine powder was added to 100 pts. wt. of a main component of a two-component urethane paint. By stirring at 4000 rpm for 10 minutes with a disperser, a main component of a ship bottom paint was prepared. Immediately before use, a curing agent was added, and the resulting mixture was used as a ship bottom paint.

4-2. Organism Adhesion Prevention Test

A paint to which the silica/PVA composite gel fine powder was added and a paint to which the silica/PVA composite gel fine powder was not added were each applied to a ship bottom of a pleasure boat. The ship bottom of the pleasure boat was immersed in the seawater for three months from the end of June to the end of September, in which bioactivity was high, in Tamano Port in Okayama Prefecture, and an adhesion state of organisms living in the ocean was observed.

It was observed that no shellfish or sea weed adhered to a surface region of the ship bottom on which the paint with the added silica/PVA composite gel fine powder had been applied. In contrast, it was observed in three months that shellfishes adhered to a surface region of the ship bottom on which the paint without the silica/PVA composite gel fine powder had been applied.

(5) Fifth Embodiment

5-1. Method for Manufacturing Paint 5 g of silica gel was added to 100 g of 5 mass % PVA solution. By stirring at 4000 rpm for 10 minutes with a disperser, a slurry was prepared, and a silica/PVA composite gel was prepared. As the PVA, a PVA having a saponification degree of 70 mol % and a viscosity-average polymerization degree of 700, PVA-417 (saponification degree: 80 mol %, viscosity-average polymerization degree: 1700, produced by KURARAY CO., LTD.), PVA-420H (saponification degree: 80 mol %, viscosity-average polymerization degree: 2000, produced by KURARAY CO., LTD.), and PVA-424H (saponification degree: 80 mol %, viscosity-average polymerization degree: 2400, produced by KURARAY CO., LTD.) were used. As the silica gel, SYLYSIA 350 produced by FUJI SILYSIA CHEMICAL LTD. was used.

The silica/PVA composite gel was dried with a 110° C. dryer for 12 hours or longer. By pulverizing the dried substance, a silica/PVA composite gel fine powder having an average particle diameter of 2.5 to 3.3 μm was obtained.

10 pts. wt. of the fine powder was added to 100 pts. wt. of a hydrolyzable paint to prepare a ship bottom paint.

5-2. Organism Adhesion Prevention Test

The hydrolyzable paint with the added silica/PVA composite gel fine powder and the hydrolyzable paint without the silica/PVA composite gel fine powder were each applied to a plate of reinforced plastic (FRP), and the plates were immersed in the seawater in Tamano Port in Okayama Prefecture for about two months to observe an adhesion state of organisms living in the ocean.

In the case of the FRP plate to which the hydrolyzable paint with added silica/PVA composite gel fine powder had been applied, adhesion of organisms living in the ocean was hardly observed. In contrast, in the case of the FRP plate to which the hydrolyzable paint without the silica/PVA composite gel fine powder was applied, it was observed that ocean organisms, such as algae and barnacles, covered the entire surface.

(6) Sixth Embodiment

6-1. Method for Manufacturing Composite Gel

By using an aqueous solution of sodium silicate and a dilute sulfuric acid, a silica sol having a silica concentration of 20 mass % was prepared. By adding 650 g of 5 mass % PVA solution to 550 g of the obtained silica sol, sufficient stirring, and leaving to stand at ambient temperatures, a composite hydrogel was prepared. As the PVA, a PVA having a saponification degree of 70 mol % and a viscosity-average polymerization degree of 700 and PVA-420H (saponification degree: 80 mol %, viscosity-average polymerization degree: 2000, produced by KURARAY CO., LTD.) was used. Through a water washing process, a drying process, and a pulverizing process of the obtained composite hydrogel, a silica/PVA composite gel fine powder was obtained. A PVA content rate in the composite gel was calculated by Formula 1 below based on a carbon content rate measured by an element analyzer.

PVA content rate (%)=carbon content rate of composite gel (%)×{100/PVA carbon content rate (%)}     [Formula 1]

The PVA content rate (baseline value: 23 mass %) of the silica/PVA composite gel fine powder was 16.5 mass % (ratio against the baseline value: 72%) when the PVA having a saponification degree of 70 mol % and a viscosity-average polymerization degree of 700 was used. Also, when PVA-420H was used, the PVA content rate of the silica/PVA composite gel fine powder was 18.5 mass % (ratio against the baseline value: 80%). Even when a silica/PVA composite gel fine powder of each of these types, an intended ship bottom paint can be obtained.

(7) Other Embodiments

Although some embodiments of the present disclosure have been described above, the present disclosure is not limited to the aforementioned specific embodiments, but may be practiced in other various forms.

For example, as a specific method for obtaining a composite gel, methods other than that exemplified in the above-described embodiment may be employed. Some examples may include, for example, obtaining a composite gel by adding an organic polymer compound solution to an inorganic component and drying and pulverizing the resulting substance.

Alternatively, for example, a composite gel may be obtained by adding an organic polymer compound solution to an inorganic component sol (for example, silica sol) to prepare a composite hydrogel, and drying and pulverizing the composite hydrogel. In a more specific example of manufacturing, 10 g of colloidal silica (SNOWTEX O produced by NISSAN CHEMICAL INDUSTRIES, LTD., silica concentration: 20 mass %), for example, is added to 20 g of PVA 5 mass % solution to prepare a slurry. By drying the slurry with a 110° C. dryer, a silica/PVA composite gel can be obtained. Alternatively, for example, 10 g of a colloidal silica (SNOWTEX O produced by NISSAN CHEMICAL INDUSTRIES, LTD., silica concentration: 20 mass %) is added to 20 g of PEG (polyethylene glycol 6000) 5 mass % solution to prepare a slurry. By drying the slurry with a 110° C. dryer, a silica/PEG composite gel can be obtained. That is, to manufacture a composite gel herein, a hydroxyl group-containing organic polymer compound other than PVA (such as the aforementioned PEG) may also be used.

Also, as the hydroxyl group-containing silicon compound, various types of silica may be employed. Specific examples may include, for example, precipitated silica, fumed silica, and silica gel. Further, hydroxyl group-containing inorganic compounds other than silica may include, for example, bentonite. Hydroxyl group-containing inorganic compounds other than silica may bring the similar effect as silica.

Moreover, although the above-described embodiment shows an example of preparing a composite gel using a raw material composition that comprises, as main components, a hydroxyl group-containing organic polymer compound (such as PVA and PEG) and a hydroxyl group-containing inorganic compound (such as silica, aluminum hydroxide, magnesium hydroxide, and iron hydroxide), an inorganic oxide may be employed in place of the hydroxyl group-containing inorganic compound. As the inorganic oxide, aluminum oxide, magnesium oxide, iron oxide, and the like may be employed.

The invention claimed is:

1. A method for manufacturing an organism adhesion reduction paint, the method comprising:
    a first process of gelling a raw material composition that comprises polyvinyl alcohol and at least one of a hydroxyl group-containing inorganic compound or an inorganic oxide;
    a second process of drying and subsequently pulverizing a resulting product in the first process to thereby obtain a composite gel fine powder; and
    a third process of adding the composite gel fine powder to one component of a two-component urethane paint and stirring, to thereby prepare one component of the organism adhesion reduction paint, and adding a curing agent immediately before use.

2. The method for manufacturing an organism adhesion reduction paint according to claim 1,
    wherein the polyvinyl alcohol has a viscosity-average polymerization degree of 350 to 3500 and a saponification degree of 50 to 100 mol %.

3. The method for manufacturing an organism adhesion reduction paint according to claim 1,
    wherein the hydroxyl group-containing inorganic compound is one, or two more selected from the group consisting of a hydroxyl group-containing silicon compound, aluminum hydroxide, magnesium hydroxide, and iron hydroxide.

4. The method for manufacturing an organism adhesion reduction paint according to claim 3,
    wherein the hydroxyl group-containing silicon compound is silica.

5. The method for manufacturing an organism adhesion reduction paint according to claim 4,
    wherein the silica is silica sol or silica gel.

6. The method for manufacturing an organism adhesion reduction paint according to claim 1,
    wherein the inorganic oxide is one, or more selected from the group consisting of aluminum oxide, magnesium oxide, and iron oxide.

7. The method for manufacturing an organism adhesion reduction paint according to claim 1,
    wherein the composite gel is compounded from the polyvinyl alcohol and the hydroxyl group-containing inorganic compound, or from the polyvinyl alcohol and the inorganic oxide.

8. The method for manufacturing an organism adhesion reduction paint according to claim 1,
    wherein 10 pts. by wt. of the composite gel fine powder is added to 100 pts. by wt. of the one component of the two-component urethane paint.

* * * * *